United States Patent [19]

Noguchi

[11] Patent Number: 4,623,917

[45] Date of Patent: Nov. 18, 1986

[54] COLOR IMAGE DATA PROCESSING DEVICE FEATURING GHOST ELIMINATION

[75] Inventor: Akio Noguchi, Kanagawa, Japan

[73] Assignee: Fuji Xerox Co., Ltd., Tokyo, Japan

[21] Appl. No.: 578,448

[22] Filed: Feb. 9, 1984

[30] Foreign Application Priority Data

Feb. 10, 1983 [JP] Japan .................................. 58-19793

[51] Int. Cl.[4] ........................... G03F 3/08; H04N 1/46
[52] U.S. Cl. ......................................... 358/80; 358/75
[58] Field of Search ............................... 358/75, 78, 80

[56] References Cited

U.S. PATENT DOCUMENTS 4,510,524 4/1985 Kurata ................................... 358/75

FOREIGN PATENT DOCUMENTS 202175 12/1982 Japan ..................................... 358/75

*Primary Examiner*—James J. Groody
*Assistant Examiner*—Randall S. Svihla
*Attorney, Agent, or Firm*—Sughrue, Mion, Zinn, Macpeak, and Seas

[57] ABSTRACT

A color image processing device in which color signals representing a color of individual picture elements are input as addresses to a first semiconductor device so that correction data for correcting an target picture element are successively outputted for every separated color. A second semiconductor device is used to hold correction data for a particular color so that it can be simultaneously outputted to a logic circuit with additional correction data from the first semiconductor device for another color. The logic circuit combines the correction data from the first and second semiconductor devices with signals from the target picture element and outputs a corrected signal representing a corrected color for the target picture element.

5 Claims, 11 Drawing Figures

MAIN SCANNING DIRECTION

MAIN SCANNING DIRECTION

MAIN SCANNING DIRECTION

MAIN SCANNING DIRECTION

MAIN SCANNING DIRECTION

MAIN SCANNING DIRECTION

FIG. 7

| PATTERN EXAMPLE | ADDRESS DATA FROM BLACK SIGNAL | CORRECTION DATA 39B | | | | | | | | ADDRESS DATA FROM RED SIGNAL | CORRECTION DATA 39R | | | | | | | | FINAL DECISION COLORS | DECISION CONDITIONS |
|---|---|---|---|---|---|---|---|---|---|---|---|---|---|---|---|---|---|---|---|---|
| | | 7 | 6 | 5 | 4 | 3 | 2 | 1 | bit 0 | | 7 | 6 | 5 | 4 | 3 | 2 | 1 | bit 0 | | |
| a | 499H | 0 | 0 | 0 | 0 | 0 | 0 | 1 | 1 | 366H | 1 | 0 | 0 | 0 | 0 | 0 | 0 | 1 | RED | WITH BIT 0=1, COIN. BIT 1~7, INCO. |
| b | 499H | 0 | 0 | 0 | 0 | 0 | 0 | 1 | 1 | 000H | 0 | 0 | 0 | 0 | 0 | 0 | 0 | 0 | WHITE | BIT 0 B;1, R;0 BIT 1~7, ARB. |
| c | 499H | 0 | 0 | 0 | 0 | 0 | 1 | 1 | 1 | 326H | 0 | 0 | 0 | 0 | 0 | 1 | 1 | 1 | BLACK | WITH BIT 0=1, COIN. BIT 1~7, COIN. |
| d | 407H | 0 | 0 | 0 | 0 | 1 | 0 | 0 | 1 | 070H | 0 | 0 | 0 | 0 | 1 | 0 | 1 | 1 | BLACK | WITH BIT 0=1, COIN. BIT 1~7, COIN. |
| e | 401H | 0 | 0 | 0 | 0 | 1 | 0 | 0 | 1 | 01AH | 0 | 1 | 0 | 0 | 0 | 0 | 0 | 0 | WHITE | BIT 0 B;1, R;0 BIT 1~7, ARB. |
| f | 498H | 0 | 0 | 0 | 0 | 1 | 0 | 0 | 1 | 100H | 0 | 0 | 1 | 0 | 0 | 0 | 0 | 1 | BLACK | WITH BIT 0=1, COIN. BIT 1~7, COIN. |
| g | 4A5H | 1 | 1 | 1 | 1 | 1 | 1 | 1 | 1 | 348H | 1 | 1 | 1 | 1 | 1 | 1 | 1 | 1 | RED | BIT 0 B;0, R;1 BIT 1~7, ARB. |
| h | 7FFH | 1 | 1 | 1 | 1 | 1 | 1 | 1 | 1 | 000H | 0 | 0 | 0 | 0 | 0 | 0 | 0 | 0 | WHITE | WITH BIT 0=0, COIN. BIT 1~7, ARB. |
| i | 498H | 1 | 1 | 1 | 1 | 1 | 1 | 1 | 1 | 000H | 0 | 0 | 0 | 0 | 0 | 0 | 0 | 0 | WHITE | WITH BIT 0=0, COIN. BIT 1~7, ARB. |

B: BLACK  R: RED
COIN: COINCIDENCE
INCO: INCOINCIDENCE
ARB: ARBITRARY

COLOR IMAGE DATA PROCESSING DEVICE FEATURING GHOST ELIMINATION

FIELD OF THE INVENTION

This invention relates to a color image data processing device for correcting color-separated color signals in a reading device which reads a color picture for every picture element to perform color separation.

BACKGROUND OF THE INVENTION

In a color copying machine or a color facsimile system using photo-electric conversion elements such as CCD's, optical mirrors and dichroic mirrors are employed to read a color picture in different wavelength ranges. A plurality of image signals thus read are processed by a color separation circuit, so as to provide image signals which have been color-separated as desired. The color picture is processed for every picture element as described above; however, it is not always true that the color-separated color signals exactly represent the colors of the respective picture elements of the color picture. The reasons for this are, for example, as follows:

(1) The chromatic aberration of the image forming lens.

(2) In the case where a plurality of reading systems are employed, the reading systems are different from one another in the magnifications of the central and peripheral portions of the lens.

(3) when a plurality of reading systems are used, the optical axes of the reading systems are not in alignment with one another, and the reading systems differ in the focal length of the lens.

(4) When analog data, outputted by the photoelectric conversion element is binary-encoded, the image signals are different in threshold level.

Because of the above-described mechanical, physical or optical reasons, even if excellent optical components are arranged with high accuracy and with ordinary resolution, a ghost on the order of two bits maximum may be formed in the main scanning direction and a ghost on the order of one bit may be formed in the auxiliary scanning direction. The term "ghost" is intended to mean a belt-shaped region of data R (representing red) which, as shown in FIG. 1, is formed on the boundary between the region of data B (representing black) and the region of data W (representing white), on the output side of a reading device adapted to read black and red. In this case, the original color picture is shown in FIG. 2. If the color image data is as shown in FIG. 2, then the color image data has been correctly read and no ghost has been formed.

If the ghost is formed, then not only are images recorded or displayed on a display unit with low quality color image data, but also an image editing device may recognize the ghost as an actual line or line drawing, thus making errors in the editing operation. All the thin lines outputted by the reading device may be eliminated as ghosts. However, if this method is employed, then almost all the effective image data are removed, which provides worse results.

SUMMARY OF THE INVENTION

In view of the foregoing, an object of this invention is to provide a color image data processing device which can effectively remove ghosts from color-separated color signals.

The foregoing object of the invention has been achieved by the provision of a color image data processing device which, according to the invention, comprises: a first semiconductor device in which, of the color separated image signals, those of the peripheral picture elements surrounding each of the target picture elements, which are successively targeted for correction, are used as address inputs so that correction data for correcting the target picture element are successively outputted for every separated color; a second semiconductor device in which correction data, other than that of a color which is outputted for each target picture element, are held until the last correction data is outputted; and a logical decision circuit for successively determining colors to which the target picture elements should belong from combined correction data for said target picture elements which are outputted by the first and second semiconductor memory device simultaneously.

BRIEF DESCRIPTON OF THE DRAWINGS

FIG. 7 is an explanatory diagram showing the contents of the read-only memory with the decision contents of a logical decision circuit in FIG. 3.

DETAILED DESCRIPTION OF THE INVENTION

Figure 3:
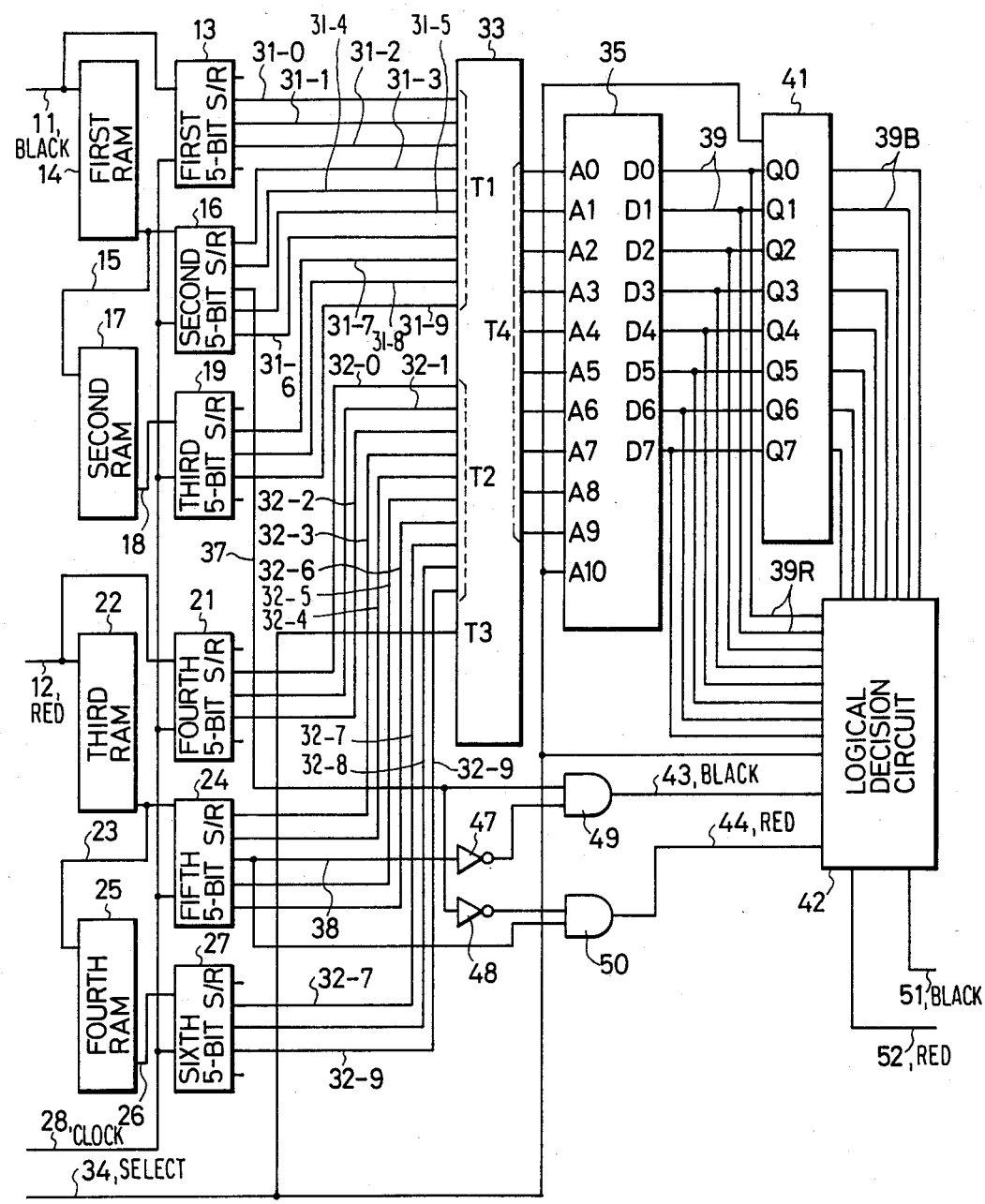
FIG. 3 is a block diagram of the color image data processing device according to one embodiment of the invention.

FIG. 3 shows a color image data processing device used in a reading device adapted to read red and black. The reading device receives a black signal (color signal) 11 and a red signal (color signal) 12 from a color separation circuit, or generating means (not shown). The black signal 11 represents black for a picture element when it is at a logic level "1" (hereinafter referred to merely as "1", when applicable) and represents white when it is at a logic level "0" (hereinafter referred to merely as "0", when applicable). The red signal 12 represents red for a picture element when it is at "1", and white when it is at "0". The black signal 11 is applied to a first 5-bit shift register 13, and is delayed one line by a first random access memory 14. The black signal (15) thus delayed is supplied to a second 5-bit shift register 16 and is further delayed one line by a second random access memory 17. The black signal (18) which has been delayed two lines is applied to a third 5-bit shift register 19. The red signal 12 is supplied to a fourth 5-bit shift register 21 and is delayed one line by a third random access memory 22. The red signal (23) thus delayed is applied to a fifth 5-bit shift register 24 and is further delayed one line by a fourth random access memory 25. The red signal (26) which has been delayed two lines is supplied to a sixth 5-bit shift register 27. A clock signal 28 having a predetermined frequency is applied to the shift registers 13, 16, 19, 21, 24 and 27. In synchronization with the clock signal 28, the shift registers provide signals 31-0 through 31-9 and 32-0 through 32-9 at parallel signal output terminals thereof, which are supplied to input terminal groups T1 and T2 of a selector 33.

In the selector 33, the signals applied to the input terminal groups T1 and T2 are selectively outputted through an output terminal group T4 in response to the state of a signal applied to a select terminal T3. That is, when a select signal 34 whose period is one half of that of the clock signal 28 is at a high logic level (hereinafter referred to merely as "H", when applicable), the signals 31-0 through 31-9 inputted through the input terminal group T1 are outputted through the output terminal group T4. When the select signal 34 is at a low logic level (hereinafter referred to merely as "L", when applicable), the signals 32-1 through 32-9 inputted through the input terminal group T2 are outputted through the output terminal group T4. These output signals are applied, as address data, to the input terminals A0 through A9 of a read-only memory 35.

Figure 1:
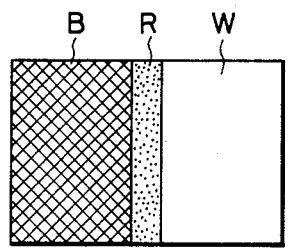
FIG. 1 is an explanatory diagram showing one example of color image data involving a ghost.
Figure 2:
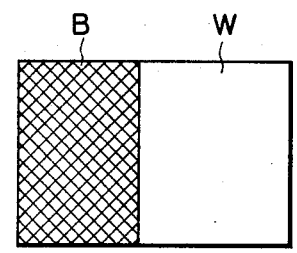
FIG. 2 is an explanatory diagram corresponding to that of FIG. 1, showing the color image data which is free from the ghost.
Figure 4:
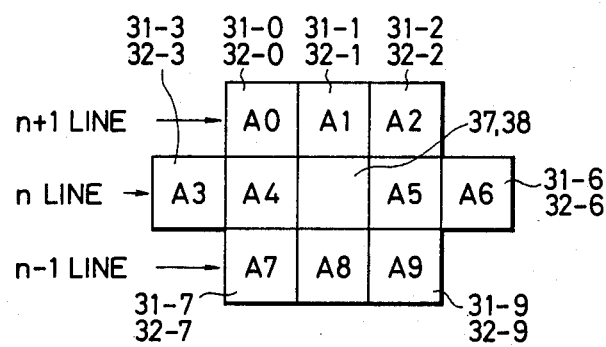
FIG. 4 is an explanatory diagram showing picture elements with the address inputs of a read-only memory.

FIG. 4 shows picture elements with signals supplied to the read-only memory 35. It is assumed that the color signals of picture elements to be corrected, namely, the color signals of target picture elements are outputted through the 2-bit delay output terminals of the second and fifth 5-bit shift registers 16 and 24, respectively, and that these target picture elements 37 and 38 are on the n-th line of the original (n being an integer). These two target picture elements 37 and 38 are of a black signal and a red signal, respectively. The first and fourth 5-bit shift registers 13 and 21 which receive the black signal 11 and the red signal 12, output signals on the (n+1)-th line which occurs one line later than the n-th line. Among these signals, the signals 31-0 and 32-0 outputted through the 1-bit (1-picture-element) delay output terminals of the shift registers 13 and 21 are assigned to the address A0 of the read-only memory 35. The signals 31-1 and 32-1 outputted through the 2-bit delay output terminals of the shift registers 13 and 21 are assigned to the address A1. The signals 31-2 and 32-2 outputted through the 3-bit delay output terminals of the shift registers 13 and 21 are assigned to the address A2. The signals 31-3 and 32-3, 31-4 and 32-4, 31-5 and 32-5, and 31-6 and 32-6 outputted through the 0-bit, 1-bit, 3-bit and 4-bit delay output terminals of the second and fifth 5-bit shift registers 16 and 24 are assigned to the addresses A3 through A6 of the read-only memory 35. The signals 31-7 and 32-7, 31-8 and 32-8, and 31-9 and 32-9 which are delayed two lines by the random acces memories 14, 17, 22, and 25 and are then outputted through the 1-bit, 2-bit and 3-bit delay output terminals of the third and sixth 5-bit shift registers 19 and 27 are assigned to the addresses A7, A8 and A9 of the read-only memory 35, respectively.

As is apparent from the above description, the color signals of ten peripheral picture elements surrounding each target picture element are used as address inputs for the read-only memory 35. The select signal 34 is inputted into the address A10 of the read-only memory 35, so that the latter 35 determines whether the signal supplied from the selector 33 is for the black signal 31 or the red signal 32, and as a result to ensure the output of the proper correction data 99 through output terminals D0 through D7, which are used to eliminate ghosts (as described in detail later). Of the correction data, the black correction data 39B is latched by a register 41, and supplied together with the red correction data 39R to a logical decision circuit 42. Data 43 and 44 for the target picture elements together with the correction data 39B and 39R are supplied to the logical decision circuit 42. The data 43 and 44 for the target picture elements are obtained by exclusively outputting the black signal of the target picture element 37 and the red signal of the target picture element 38 with the aid of inverters 47 and 48 and AND circuits 49 and 50, respectively. The logical decision circuit 42 carries out logical decision by using these data 39B, 39R, 43 and 44, to provide a black signal 51 and a red signal 52 which are free from ghosts.

In the color image data processing device, the logical decision for eliminating the ghosts is carried out under the following premises:
 (1) When the target picture element is read as red, it is determined whether or not the target picture element is red or is a ghost. A red ghost formed adacent to black should be eliminated, as it considerably detracts from the picture as a whole.
 (2) When the target picture element is red, the decision result is black, red or white.
 (3) When the target picture element is read as black, it is determined to be black and not a ghost. A black ghost adjacent to red does not detract from the picture as a whole. The frequency of formation of such a ghost is much lower than that of formation of a red ghost adjacent to black, and therefore for this case no correction is carried out. Accordingly, when an image signal representing black is supplied, i.e., the data 43 of the target picture element, to the logical decision circuit 42, the black signal (representing black) 51 is at the "H" level and is outputted unconditionally.
 (4) When the target picture element is read as white, it is determined to be white and not a ghost. In this case, the ghost does not detract from the picture as a whole. The logical decision circuit 42 outputs the black signal 51 and the red signal 52 at the "L" level.

A method of determining colors for the target picture elements under the above-described premises will be described. In the description, the term "decision region" is a reading region including an target picture element and peripheral picture elements as shown in FIG. 4.

Figure 5A:
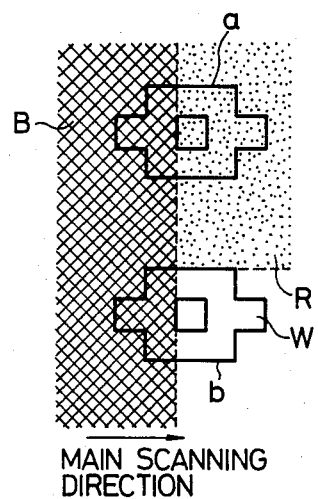
FIGS. 5a–5c and 6a–6c are explanatory diagrams showing various decision region patterns.
Figure 5B:
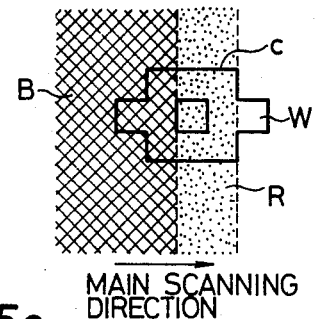
Figure 5C:
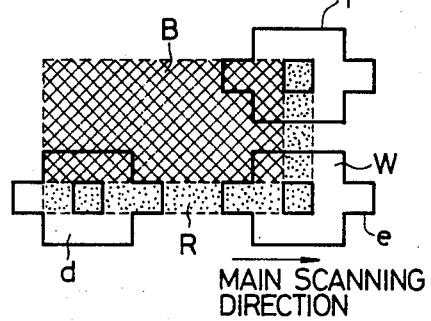

FIGS. 5a–5c show a case where a black pattern is in the decision region and the target picture element is liable to form a ghost depending on a red pattern. First, let us consider a decision region pattern a in FIG. 5a. In this case, the central square, namely, the target picture element is read as red, the addresses A0, A3, A4 and A7 in FIG. 4 as black, and the other addresses A1, A2, A5, A6, A8 and A9 as red. In this case, the target picture element is determined red on the assumption that a ghost is formed within two picture elements in the main scanning direction. In other words, when more than two picture elements are read continuously as red in the main scanning direction, these picture elements are not regarded as a ghost, and instead determined as red.

In the decision region pattern b in 5a the target picture element is white, and therefore it is decided as white under premise (4) described above.

In a decision region pattern c in FIG. 5b, a width corresponding to two picture elements is read as red in the main scanning direction. Accordingly, it can be presumed that the target picture element in the red region is a red ghost of a black picture element, and it is decided that the target picture element is black.

In each of two decision region patterns d and f in FIG. 5c, red picture elements in the form of a belt having a width corresponding to one picture element are adjacent to a black picture element or elements. Accordingly, when the target picture element is red, these picture elements can be presumed to be a red ghost of a black picture element and are determined black. On the other hand, in a decision region pattern e in FIG. 5c, the target picture element is red, and the picture elements of the addresses A2, A5, A6, A7, A8, and A9 adjacent to the target picture element are white. Accordingly, in this case, it can be presumed that the target picture element is a red ghost of a white picture element, and the target picture element is decided as white.

Figure 6A:
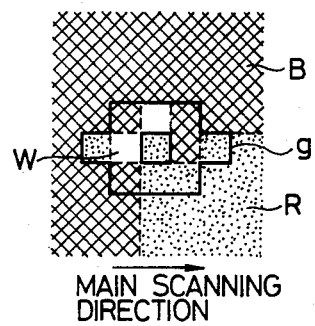
Figure 6B:
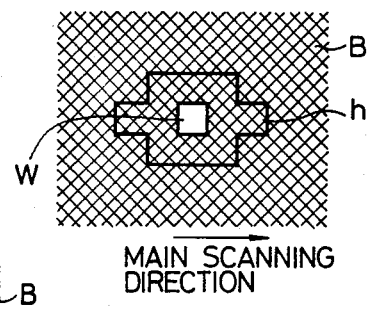
Figure 6C:
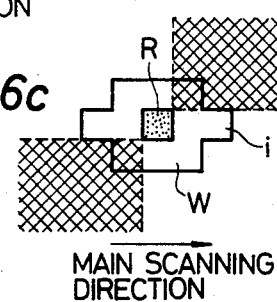

Cases where ghosts are attributed to black patterns are rare, as will be shown with reference to FIGS. 6a-6c. In a decision region pattern g in FIG. 6a, the target picture element is red and the colors are randomly arranged around the target picture element. Accordingly, it can be presumed that no ghost is formed and it is determined that the target picture element is red. In a decision region pattern h in FIG. 6b, the target picture element is white, and the other picture elements are black. In this case, it is determined under premise (4) described above that the target picture element is white and that no ghost is formed. In a decision region pattern i in FIG. 6c, the target picture element is red, and the picture elements of the addresses A2 and A7 are black. In this case, the target picture element is greatly affected by the other picture elements being white, and it is determined that the target picture element is white.

The various decision region patterns are utilized as described above, to determine colors for the target picture elements. These results are arranged in correspondence to the addresses of the decision region, thus forming the contents of the read-only memory 35. FIG. 7 shows a part of the contents of the read-only memory 35.

It is assumed in FIG. 7 that the pattern a is red. If, in this case, the above-described decision region is viewed for the black signal only, then the signals inputted into the addresses A0 through A10 of the read-only memory 35 are as follows (however, it should be noted that when the black signal is inputted, the select signal 34 is at "H", and A10=1):

A0, A3, A4, A7, A10=1

A1, A2, A5, A6, A8, A9=0

If the signals are arranged at intervals of four bits with the signal of the address A0 as the least significant bit, then the pattern a is as follows:

(1 0 0)(1 0 0 1)(1 0 0 1)

Accordingly, the address data from the black signal with respect to the pattern a is 499H in hexadecimal notation as shown in FIG. 7. For such a pattern of the black signal, the read-only memory 35 outputs 03H in hexadecimal notation. That is (0 0 0 0 0 0 1 1) is outputted as the correction data 39B as shown in FIG. 7. The patterns b and c are completely equal to the pattern a as far as the black signal is concerned, and therefore the same correction signal is outputted.

When the pattern a is viewed for the red signal only, then the signals inputted into the addresses A0 through A10 of the read-only memory 35 are as follows (however, in this case, it should be noted that, when the red signal is inputted, the select signal 34 is at "L", and A0=0):

A0, A3, A4, A7, A10=0

A1, A2, A5, A6, A8, A9=1

This is 366H in hexadecimal notation as shown in FIG. 7. For this pattern of the red signal, the read-only memory 35 outputs 81H in hexadecimal notation; that is, (1 0 0 0 0 0 0 1) is outputted as the correction data 39R as indicated in FIG. 7.

The two correction data 39B and 39R are checked by the logical decision circuit 42. When the 0 bits of these data are 1, and the 1 through 7 bits are not equal, the logical decision circuit 42 logically determines that the pattern a is provided. Under the conditions that the red data 44 of the target picture element is 1 and the black data 43 is 0, the logical decision circuit finally determines the target picture element red. However, according to the above-described premise, if the black data 43 is 1, then the target picture element is determined black irrespective of the correction data 39B and 39R; and if the black data 43 and the red data 44 are 0, then the target picture element is determined white. If it is finally determined that the target picture element is red, then the black signal 51 is set to 0 and the red signal 52 is raised to 1.

In the following Table 1, the address data from the black signals and the correction data outputted by the read-only memory 35 are expressed in hexadecimal notation. Similarly, in the following Table 2, the address data from the red signal and the correction data outputted by the read-only memory 35 are expressed in hexadecimal notation. For other patterns, the correction data 39B and 39R can also be outputted in hexadecimal notation as indicated in these Tables. Using these correction data, the logical decision circuit 42 decides colors for the target picture elements according to decision conditions which are indicated in the rightmost position of FIG. 7.

TABLE 1

| Address data from black signal | Correction data 39B |
|---|---|
| 499H | 03H |
| 407H | 05H |
| 401H | 09H |
| 498H | 11H |
| . | . |
| . | . |
| . | . |
| 4A5H | FEH |
| 7FFH | FEH |
| 484H | FEH |
| . | . |
| . | . |
| . | . |

TABLE 2

| Address data from red signal | Correction data 39R |
|---|---|
| 366H | 81H |
| 000H | 00H |
| 326H | 03H |
| 070H | 05H |
| 01AH | 40H |
| 100H | 11H |
| . | . |
| . | . |
| . | . |

TABLE 2-continued

| Address data from red signal | Correction data 39R |
|---|---|
| . | . |
| . | . |
| 348H | FFH |
| . | . |
| . | . |

Then, the black data 43, the red data 44 and the correction data are subjected to a final logical operation, to decide the color of the target picture element. The target picture elements are subjected to color decision one by one in synchronization with the clock signal 28, so that the logical decision circuit 42 serially outputs data 51 and 52 which are free from ghosts.

In the above-described color image data processing device, for simplification in description, two colors, black and red, are read. However, the technical concept of the invention can be similarly applied to the case where other colors are read, or more than two colors are read. Furthermore, in the above-described embodiment, for simplification in description, some premises have been provided. It goes without saying the these premises may be suitably modified. For instance, it is possible to process the color data with higher precision, with the black ghost of a red picture element taken into account. This process can be achieved merely by additionally providing a logical decision circuit. The logical decision circuit can be made simple in arrangment by using a programmable random logic array as its arithmetic circuit.

As is apparent from the above description, semiconductor memory devices are employed according to the invention. Accordingly, the following effects result: (1) employment of a rewritable EPROM (erasable programmable read only memory) makes it possible to flexibly handle the generated patterns of the peripheral picture elements; (2) since the data of the peripheral picture elements are employed as the address inputs, the generated pattern can be accurately dealt with; (3) the image data of the peripheral picture elements can be inputted as far as the addresses of the read-only memory permits, and the decision region for detecting the presence or absence of the ghost can be increased; and (4) not only can the image data be processed accurately as described above, but the use of semiconductor memory devices also makes it possible to simplify the arrangement of the hardware. Therefore, the color image data processing device of the invention is low in manufacturing cost and high in reliability.

I claim:

1. In a reading device for reading a color picture comprising a target picture element and a plurality of peripheral picture elements positioned around said target picture element in a predetermined relationship, a color image data processing device comprising:

generating means for receiving first and second signals, for generating delayed first and second signals, said delayed first and second signals each representing a color of said target picture element, and for generating a plurality of third and fourth signals, each particular third and fourth signal each representing a color of a particular picture element of said plurality of peripheral picture elements;

correction data generating means responsive to a combination of said third signals for generating first correction data representing a color of said target picture element and responsive to a combination of said fourth signals for generating second correction data representing a color of said target picture element; and processing means for logically combining said delayed first and second signals and said first and second correction data for outputting a corrected signal representing a corrected color for said target picture element.

2. A color image data processing device as claimed in claim 1, wherein said generating means receives a series of said first signals and a series of said second signals, and wherein said generating means comprises:

a delay means for receiving said series of first signals and said series of second signals and outputting said delayed first and second signals, and for simultaneously outputting as said combination of third signals a first plurality of delayed signals from said first series each delayed by a respective amount so that each of said first plurality of delayed signals corresponds to a respective one of said plurality of peripheral picture elements and for outputting as said combination of fourth signals a second plurality of delayed signals from said second series each delayed by a respective amount so that each of said second plurality of delayed signals corresponds to a respective one of said plurality of peripheral picture elements.

3. A color image data processing device as claimed in claim 2, wherein said correction data generating means comprises:

a read-only memory means for receiving said first plurality of delayed signals as an address and outputting the corresponding said first correction data and for receiving said second plurality of delayed signals and outputting the corresponding said second correction data.

4. A color image data processing device as claimed in claim 3, wherein said correction data generating means further comprises:

a storage means for receiving said first correction data from said read-only memory means and for outputting said first correction data simultaneously with the outputting of said second correction data from said read-only memory means; and a logic circuit means for receiving said first correction data from said storage means, said second correction data from said read-only memory means, and said delayed first and second signals from said delay means, and for outputting said corrected signal.

5. A color image data processing device as claimed in claim 4, wherein said reading device reads black, red or white colors and wherein said first signal represents whether a corresponding target picture element is read as black or white, said second signal represents whether a corresponding target picture elment is read as red or white, each of said third signals represents whether each of said peripheral picture elements is read as black or white, and each of said fourth signals represents whether each of said peripheral picture elements is read as red or white.

* * * * *